(12) United States Patent
Post

(10) Patent No.: US 6,906,446 B2
(45) Date of Patent: Jun. 14, 2005

(54) HALBACH ARRAY GENERATOR/MOTOR HAVING MECHANICALLY REGULATED OUTPUT VOLTAGE AND MECHANICAL POWER OUTPUT

(75) Inventor: Richard F. Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 93 days.

(21) Appl. No.: 09/946,309

(22) Filed: Sep. 5, 2001

(65) Prior Publication Data

US 2003/0057791 A1 Mar. 27, 2003

(51) Int. Cl.[7] .............................................. H02K 1/00
(52) U.S. Cl. ..................... 310/191; 310/112; 310/113
(58) Field of Search .......................... 310/191, 74, 112, 310/113, 117, 121, 156.01, 254

(56) References Cited

U.S. PATENT DOCUMENTS

| | | | | |
|---|---|---|---|---|
| 4,438,362 A | * | 3/1984 | Brown | 310/152 |
| 5,495,221 A | | 2/1996 | Post | 335/299 |
| 5,705,902 A | | 1/1998 | Merritt et al. | 318/254 |
| 5,834,874 A | * | 11/1998 | Krueger et al. | 310/191 |
| 5,883,499 A | | 3/1999 | Post | 322/4 |
| 6,111,332 A | * | 8/2000 | Post | 310/90.5 |
| 6,404,097 B1 | * | 6/2002 | Pullen | 310/268 |

FOREIGN PATENT DOCUMENTS

| | | |
|---|---|---|
| DE | 10 88 600 B | 9/1960 |
| JP | 11-187636 | 10/1999 |

OTHER PUBLICATIONS

Klaus Halbach, "Application of permanent magnets in accelerators and electron storage rings (invited)"; Journal of Applied Physics; Apr. 15, 1985, pp. 3605–3608.

* cited by examiner

Primary Examiner—Thanh Lam
(74) Attorney, Agent, or Firm—John P. Wooldridge; James M. Skorich; Alan H. Thompson

(57) ABSTRACT

A motor/generator has its stationary portion, i.e., the stator, positioned concentrically within its rotatable element, i.e., the rotor, along the axis of rotation of the rotor. The rotor includes a Halbach array of magnets. The voltage and power outputs are regulated by varying the radial gap in between the stator windings and the rotating Halbach array. The gap is varied by extensible and retractable supports attached to the stator windings that can move the windings in a radial direction.

14 Claims, 3 Drawing Sheets

HALBACH ARRAY GENERATOR/MOTOR HAVING MECHANICALLY REGULATED OUTPUT VOLTAGE AND MECHANICAL POWER OUTPUT

The United States Government has rights in this invention pursuant to Contract No. W-7405-ENG-48 between the United States Department of Energy and The University of California for the operation of Lawrence Livermore National Laboratory.

BACKGROUND OF THE INVENTION

1. Field of the Invention

The present invention relates generally to generators and motors and, more particularly, to regulating their voltage and power by mechanically varying the radial gap between a stator comprised of conductive windings and a rotor that includes a Halbach magnet array.

2. Description of Prior Art

There are numerous applications that require compact pulsed-power systems with power outputs of hundreds of megawatts, associated with energy storage capabilities of hundreds of megajoules. These range from emergency power needs and utility electric power conditioning and stabilization, to pulsed laser fusion or magnetic fusion systems. Utilities employ battery banks or large cryogenic systems including superconducting magnets for energy storage. Condenser banks are commonly used in laser and magnetic fusion applications.

Flywheel energy-storage systems with rotors fabricated from high-strength fiber composite are integrated with high-power electrical generators for use during unexpected intermittent loss of network electrical power to sensitive electronic equipment, such as computers or automated production lines. Flywheel energy storage systems typically operate over a range of angular velocity lying between a maximum determined by structural limitations, and one-half the maximum, at which point ¾ of the kinetic energy of the flywheel has been extracted. In the absence of voltage compensation, the output voltage will fall to half its initial value at this point. However, compensating for this great a change by electronic regulation or external circuits is expensive. An example of a means for regulation of the voltage that requires external circuitry is described in U.S. Pat. No. 5,883,499, "Method for Leveling the Power Output of an Electromechanical Battery as a Function of Speed," issued to the present inventor.

Halbach arrays comprise the most efficient way to employ permanent-magnet material for the generation of dipole and higher-order pole magnetic fields within a given volume of space. They require neither "back-iron" elements nor iron pole faces in their construction, and they produce fields that approach the theoretical ideal of field uniformity (dipole arrays) or of sinusoidal variation with rotation (higher-order arrays). As such they are ideally suited for use in generators or motors constructed with air-cored stator windings; that is, windings constructed without the use of the laminated iron elements typically used in conventional generators and motors. Using air-cored stator windings avoids the hysteresis losses and limitation on the peak power caused by the magnetic saturation of laminated iron elements and the increased inductance of the stator windings in comparison to air-cored stator windings.

A generator/motor that employs a dipole version of a Halbach array is described in U.S. Pat. No. 5,705,902, titled "Halbach Array DC Motor/Generator," issued to Bernard T. Merritt, Gary R. Dreifuerst, and Richard F. Post, the present inventor. A generator/motor system that employs higher-order Halbach arrays to produce its magnetic fields is described in U.S. Pat. No. 6,111,332, titled "Combined Passive Bearing Element/Generator Motor," also issued to Richard F. Post.

The present invention incorporates novel features in such a way as to improve the performance of motor/generators incorporating Halbach arrays, and overcome limitations and drawbacks of the prior art.

SUMMARY OF THE INVENTION

Briefly, the present invention is a motor/generator having its stationary element, i.e., the stator, positioned concentrically within the rotating part, i.e., the rotor, along the rotor's axis of rotation. The rotor includes a Halbach array. The stator windings are switched or commutated to provide a DC motor/generator much the same as in a conventional DC motor. The commutation may be performed by mechanical means using brushes or by electronic means using switching circuits. The stator windings are respectively attached to extensible and retractable supports that can move the windings in a radial direction. The voltage and power outputs are regulated by adjusting the supports to vary the radial gap in between the stator and the rotating Halbach array.

DETAILED DESCRIPTION OF THE INVENTION

Figure 1:
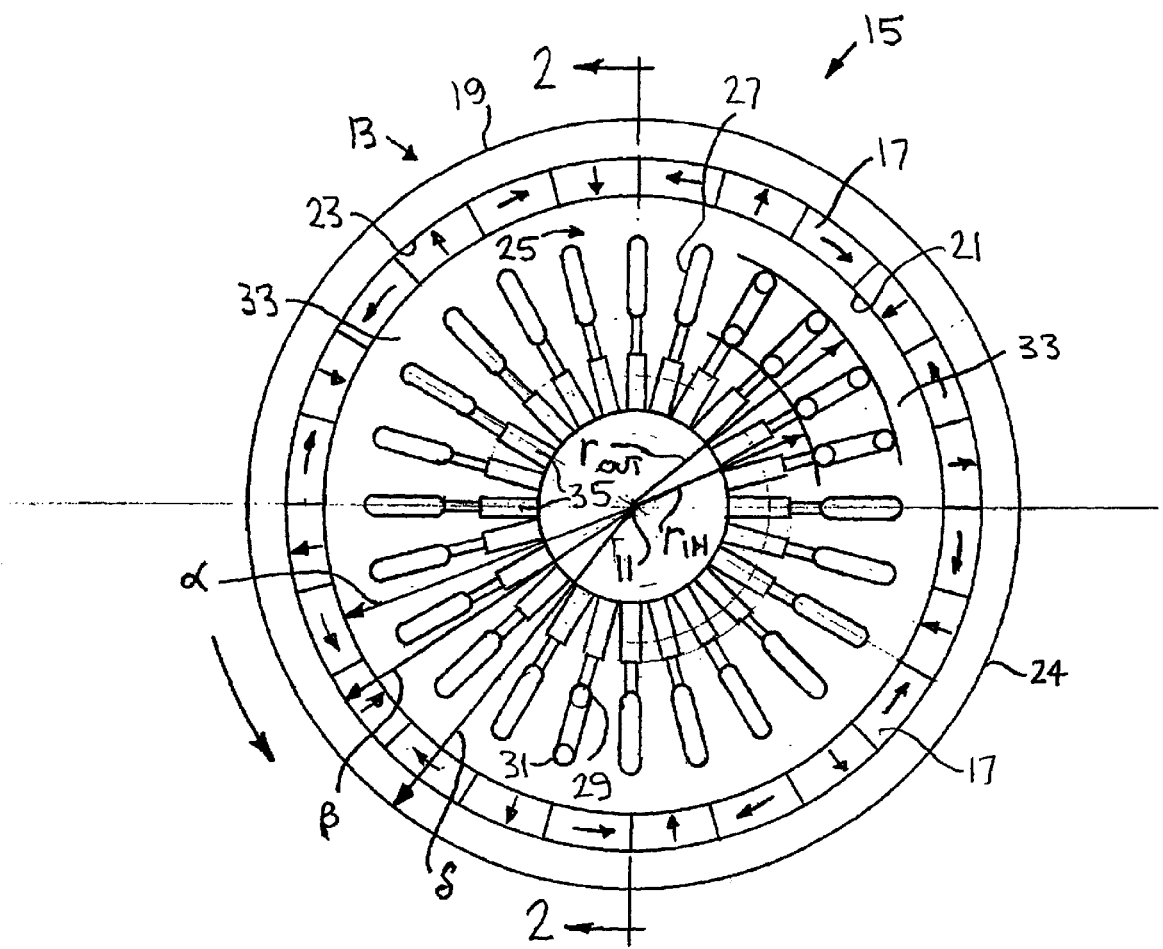
FIG. 1 is a section view taken normal to the axis of rotation of the rotor of the motor/generator of the present invention.

Turning to the drawings, FIG. 1 is a cross section taken normal to the axis of rotation 11 of rotor 13 of motor/generator 15 of the present invention. More particularly, rotor 13 includes Halbach array 17 consisting of magnets arranged in a Halbach configuration to form a cylinder about axis of rotation 11 and having a rotational degree of freedom about axis 11. Halbach array 17 is concentric with and attached to cylinder 19. Halbach array 17 includes inner surface 21 lying at radius $\alpha$ with respect to axis 11, and outer surface 23 lying at radius $\beta$ with respect to axis 11. Cylinder 19 has an inner circumference having radius $\beta$ with respect to axis 11, and an outer surface 24 lying at radius $\delta$ with respect to axis 11.

Figure 2:
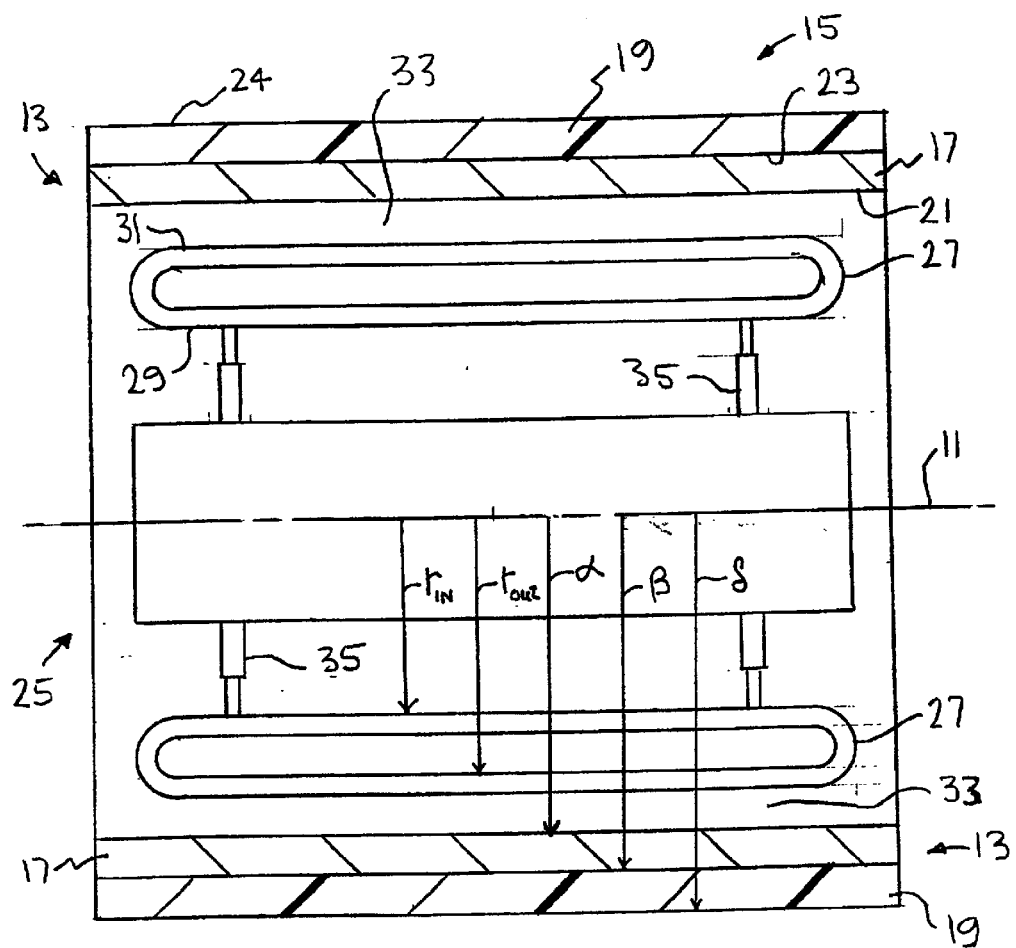
FIG. 2 is a section view of the motor/generator of the present invention taken along line 2—2 of FIG. 1.

Stator 25 lies concentrically within rotor 13, and does not rotate relative to axis 11. FIG. 2 is a cross section taken along line 2—2 of FIG. 1. As particularly shown therein, stator 25 includes conductive windings 27. Electrical leads for windings 27 are not shown.

Each winding 27 is a rectangle comprised of inner section 29 located at inner radius $r_{in}$ with respect to axis 11, and outer section 31 located at outer radius $r_{out}$ with respect to axis 11. Gap 33 between each outer section 31 of windings 27 and inner surface 21 is thus equal to $(\alpha - r_{out})$. Each winding 27 is mounted on a support 35 that is extensible and retractable, and can thus translate winding 27 radially with respect to axis 11 to vary gap 33. As will subsequently be explained, varying gap 33 varies the voltage induced in windings 27 when rotor 13 is rotated relative to stator 25 when motor/generator 15 functions as a generator, and varies the power produced when motor/generator 15 functions as a motor.

With regard to the operation of motor/generator 15 as a generator, the upper limit to the specific power output (power output per kilogram of weight) of air-cored generators of the type of motor/generator 15 can be estimated by analyzing the so called Poynting vector, P, which defines the local value of the energy flux, in units of watts/m², carried by an electromagnetic field. The Poynting vector, P, in a vacuum is defined by the equation:

$$P = (E \times B)/\mu_0 \text{ watts/m}^2 \qquad (1)$$

where: E (volts/m.) is the value of the electric field;
B (tesla) is the magnetic field vector; and
$\mu_0$, the permeability of free-space, $= 4\pi \times 10^{-7}$ (henrys/meter).

The electric field in the frame at rest, stator 25, arises from the relativistic transformation of the magnetic field from the rotating frame, rotor 13. This transformation is governed by the relativistic relationship:

$$E + (v \times B) = 0 \qquad (2)$$

where v is the velocity vector in the direction of transport of the rotating magnetic field, and v has only one component in this case, the azimuthal component, $v_\phi$.

Solving Equation 2 for E, inserting this result into equation 1, and performing the vector product called for therein results the following relationship for P:

$$P = [B^2 v - (v \cdot B) B]/\mu_0 \text{ watts/m}^2 \qquad (3)$$

Taking the component of P in the direction of v provides an expression for the rate of power flow through the circuits:

$$(P \cdot v)/v = v_\phi B^2 [1 - \cos^2(\theta)]/\mu_0 \qquad (4)$$

where the angle $\theta$ is the angle between v and B.

In the magnetic field emanating from rotating Halbach array 17, the angle $\theta$ rotates continuously at a rate equal to the angular velocity of rotor 13, $\omega_0$, multiplied by the order, N, of the pole. Taking the time average of the Poynting vector component gives a value for the average power through a surface area perpendicular to v as follows:

$$<(P \cdot v)/v> = v_\phi (B^2/2\mu_0) \text{ watts/m}^2 \qquad (5)$$

This equation can be interpreted as representing the result of transporting magnetic stored energy, $U = (B^2/2\mu_0)$ joules/m³ at a velocity, $v_\phi$ through a surface perpendicular to $v_\phi$. It is assumed that $v_\phi \ll c$, where c is the velocity of light.

The magnitude of the energy flux represented in a practical situation can be estimated from the following example. Assume that Neodymium-Iron-Boron permanent magnets, for which the remanent field, $B_r$, is equal to or greater than 1.2 tesla, are used in Halbach array 17 and that the azimuthal velocity of the array, $v_\phi$, equals $10^3$ m/sec, a typical value for a fiber composite rotor. From the equations for the Halbach array 17 given below, the peak surface field of the array, $B_0$, can be determined. In typical cases it is approximately equal to 1.0 tesla. Using the above velocity and inserting a magnetic field $B_0 = 1.0$ tesla as illustrative values, the power per unit area predicted by Equation 5 is 400 mw/m². As will be later discussed, generators of the type that are the subject of the present invention can achieve power outputs into matched loads that represent a substantial fraction of this calculated incident power level, a level that represents the theoretical upper limit to the power transfer. Such power flux levels are very high as compared to conventional commercial iron-cored generators, for which the corresponding power flux levels are typically less than 1.0 mw/m².

Equation 5 can be used to provide an estimate of the power output of motor/generator 15, and to derive scaling laws for that power output. The magnetic field from Halbach array 17, in cylindrical coordinates, is given by the following equations:

$$B_\rho = B_0 \left[\frac{\rho}{\alpha}\right]^{N-1} \cos(N\phi) \qquad (6)$$

$$B_\phi = -B_0 \left[\frac{\rho}{\alpha}\right]^{N-1} \sin(N\phi) \qquad (7)$$

$$B^2 = B_0^2 \left[\frac{\rho}{\alpha}\right]^{2N-2} \qquad (8)$$

where:

$$B_0 = B_r \left[\frac{N}{N-1}\right][1 - (\alpha/\beta)^{N-1}] C_N \qquad (9)$$

$$C_N = \cos^N(\pi/M) \left[\frac{\sin(N\pi/M)}{(N\pi/M)}\right] \qquad (10)$$

$\rho$ (m.) is the radius variable;
N is the pole order of array 17 (the number of wavelengths around inner surface 21);
$B_r$ (tesla) is the remanent field of the permanent-magnet material; and
M is the total number of magnets in array 17. (As there are 4 magnets per azimuthal wavelength in the Halbach array shown in FIG. 1, in this case M=4N).

To evaluate the Poynting vector of the power flux from Halbach array 17, it is necessary to insert $B^2$ from Equation 8 into Equation 5, set $v_\phi = \rho \omega_0$, and integrate over the radius between 0 (axis 11) and $\alpha$, thereby finding the maximum value of the power flux through a single winding 27 having an axial length h (m.), and lying in a radial plane. The result is:

$$P_0 = h \int_0^\alpha \left[\frac{\langle P \cdot v \rangle}{v}\right] d\rho = \frac{B_0^2 \alpha^2 h \omega_0}{4\mu_0 N} \text{ watts/winding} \qquad (11)$$

More power can be extracted, of course, by increasing the number of windings 27 deployed azimuthally. At some point, however, the energy extracted will approach the limiting rate at which it can flow in from the electromagnetic field. In keeping with the purpose of this discussion, no attempt will be made to solve the problem of determining the ideal number of windings 27. Instead, it is assumed that if windings 27 are spaced one half-wavelength apart azimuthally, they will be sufficiently decoupled from each other so that the following simple calculation will provide a reasonable estimate. As will be later shown, where an explicit calculation is done for the energy coupled out of windings 27 into a matched load, this assumption is useful for determining the scaling laws of the system and for estimating the maximum power output that can be expected.

Assuming that the number of windings 27 equals 2N, i.e., that they are spaced one-half wavelength apart, the total power flow through the area circumscribe by windings 27 is expressed as follows:

$$P_{2N} = \left[\frac{B_0^2 \alpha^2 h \omega_0}{2\mu_0}\right] \text{ watts} \qquad (12)$$

In the simplest terms, this result corresponds to an amount of magnetic energy flowing through windings 27 at an angular frequency $\omega_0$ (rad./sec.) of rotor 13 and Halbach array 17. The controlling parameters are thus the radius, $\alpha$, and length, h, of the system, and the angular velocity, $\omega_0$, of Halbach array 17. The radius, a, and the angular velocity, $\omega_0$, are, of course, interrelated, owing to centrifugal forces that limit $\omega_0$. The order of the array, N, does not directly enter into the above expression, although there will later appear reasons to employ high-order (N>>2) Halbach arrays in order to enhance the performance of motor/generator 15.

To calculate the power output that can be expected, assume:

α=0.5 meter;

h=1.5 meters;

$B_0$=1.0 tesla; and $\omega_0$=2096 rad./sec. (20,000 RPM).

Inserting these values into Equation 12 gives a power level of 625 megawatts.

Several requirements must be satisfied to achieve such high power levels from a relatively small generator. Firstly, the angular velocity, $\omega_0$, of rotating Halbach array 17 must be sufficiently high. This requirement in turn implies that cylinder 19 must withstand the centrifugal force exerted on its inner surface by Halbach array 17. A practical solution to this problem is to fabricate cylinder 19 from a high-strength fiber composite material, such as carbon fibers bonded with epoxy resins. To avoid delamination of cylinder 19 from centrifugal stress, the wall thickness of cylinder 19 is typically limited to a radius ratio, i.e., the ratio of its outer radius, δ, to its inner radius, β, of no more than 1.3. When the inertial effect of Halbach array 17 on its inner surface 21 is taken into account, the peak tensile stress in such a thin-walled cylinder may be approximated by the following equation:

$$S = \rho_c [\omega_0 \beta]^2 G \text{ newtons/m}^2 \tag{13}$$

where:

$$G = \frac{\frac{\rho_m}{\rho_c}\left\{1 - \left[1 - \frac{\alpha}{\beta}\right]^3\right\} + \left\{\left[\frac{\delta}{\beta}\right]^3 - 1\right\}}{3\left[\frac{\delta}{\beta} - 1\right]} \tag{14}$$

$\rho_c$ (kg/m³) is the density of the material composing cylinder 19; and $\rho_m$ (kg/m³) is the density of the magnets composing Halbach array 17.

For a thin Halbach array 17 and a thin composite cylinder 19, the function G approaches the limit of 1.0. When this value for G is inserted into Equation 13, the answer corresponds to the minimum possible stress value in cylinder 19 for a given value of radius β, and angular velocity, $\omega_0$.

The optimum thickness for Halbach array 17 corresponds to that thickness which maximizes the ratio of the generating capacity to the mass of Halbach array 17. The generating capacity is proportional to $(B_0)^2$, which is in turn a function of the thickness of Halbach array 17 (see Equation 9). Taking these competing variables into account, the optimum magnet thickness (for N>>1) turns out to be 0.20λ, where λ (m.) is the azimuthal wavelength of Halbach array 17, given by the equation:

$$\lambda = 2\pi\alpha/N \text{ meters} \tag{15}$$

Figure 3:
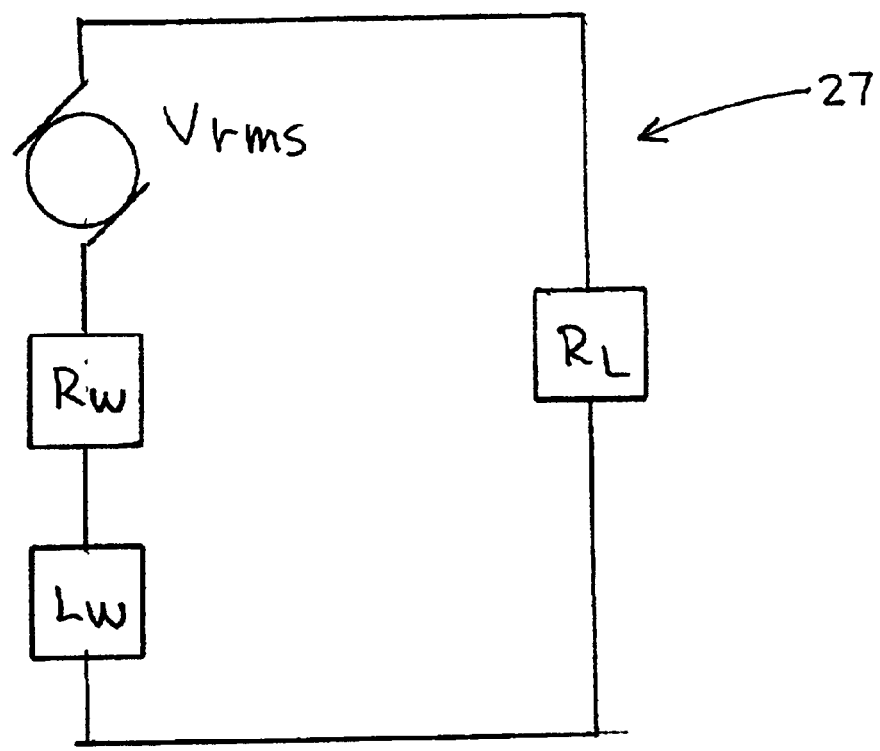
FIG. 3 is a schematic drawing of one of the stator windings of the present invention, represented by a series circuit composed of a voltage source, two resistors, and an inductor.

In the analysis of generator/motor 15 for the purpose of optimizing its power output, the issue of maximizing the power transfer to an external load must be considered. Since there are no ferro-magnetic materials in motor/generator 15, the elements of windings 27 are all linear and the analysis is greatly simplified. Each winding 27 and its load can therefore be electrically represented by the circuit diagram shown in FIG. 3.

More particularly, the rotating Halbach array 17 of FIG. 1 induces an rms voltage, $V_{rms}$, in stator windings 27, characterized by an inductance, $L_w$ (henrys), and a series resistance, $R_w$ (ohms). The output current is delivered to a load resistance, $R_{load}$. In practice, $R_w << R_{load}$ and $R_w$ can be neglected in comparison to other quantities. In this case the maximum power that can be delivered occurs for a load resistance equal to the inductive impedance of windings 27, $\omega L_w$, and is given by the equation:

$$P_{\max} = \frac{1}{2}\left[\frac{V_{rms}^2}{\omega L_w}\right] \text{ watts} \tag{16}$$

where: ω is the frequency for the output voltage and is equal to $N\omega_0$; and $V_{rms}$ is the output voltage.

$V_{rms}$ may be determined using the equations for the magnetic field of Halbach array 17, i.e., equations 6, 7, 9, and 10. The voltage in winding 27 is derived from the time-varying azimuthal flux through the area in between $r_{out}$ and $r_{in}$ produced by the azimuthal component of the magnetic fields of Halbach array 17. Integrating this field component over the area enclosed by one of windings 27 results in an expression for the induced voltage as a function of time:

$$V(t) = B_0 \alpha h \omega_0 \left[\frac{r_{out}}{\alpha}\right]^N \left\{1 - \left[\frac{r_{in}}{r_{out}}\right]^N\right\} \cos(N\omega_0 t) \text{ volts} \tag{17}$$

The square of the rms value of this expression may now be inserted into Equation 16 to determine the maximized power per circuit into a matched load. The result is given by the following equation:

$$P_{\max} = \frac{1}{4}\left[\frac{B_0^2 \alpha^2 h^2 \omega_0}{N L_g}\right]\left(\frac{r_{out}}{\alpha}\right)^{2N}\left[1 - \left(\frac{r_{in}}{r_{out}}\right)^N\right]^2 \text{ watts/circuit} \tag{18}$$

The inductance (self plus mutual) of winding 27 has been calculated using theory and may be used to evaluate the inductance term, $L_g$, in Equation 18. The result is:

$$L_g = \frac{\mu_0 P_c}{2 k d_C} \text{ henrys} \tag{19}$$

where: $P_c$ (m.) is the distance around the perimeter of one of windings 27; that is, the length of the conductor comprising one of windings 27;

k=2Π/λ=N/α is the azimuthal wavelength of Halbach array 17; and $d_c$ (m.) is the center-to-center spacing (in the azimuthal direction) in between each of windings 27

Substituting Equation 19 for $L_g$ into Equation 18 results in an expression for the maximized power per winding 27:

$$P_{\max} = \frac{1}{2}\left[\frac{B_0^2 \alpha h^2 \omega_0 d_c}{\mu_0 P_c}\right]\left(\frac{r_{out}}{\alpha}\right)^{2N}\left[1 - \left(\frac{r_{in}}{r_{out}}\right)^N\right]^2 \text{ watts/winding} \tag{20}$$

The maximized total output of motor/generator 15 is then given by multiplying Equation 20 by the number of windings 27, $n_w$, given by the ratio of the circumference of winding 27 to the center-to-center azimuthal spacing between the individual windings 27:

$$n_w = 2\pi r_{out}/d_c \tag{21}$$

The maximized total power output is thus given by the following equation:

$$\sum P_{\max} = \left[\frac{\pi B_0^2 \alpha^2 h^2 \omega_0}{\mu_0 P_c}\right]\left(\frac{r_{out}}{\alpha}\right)^{(2N+1)}\left[1 - \left(\frac{r_{in}}{r_{out}}\right)^N\right]^2 \text{ watts} \quad (22)$$

Note that the distance around the perimeter of one of windings 27, $P_c$, is given by the expression:

$$P_c = 2[h + (r_{out} - r_{in})] = 2h\left[1 + \left(\frac{r_{out}}{r_{in}}\right)\left(1 - \frac{r_{in}}{r_{out}}\right)\right] \text{ meters} \quad (23)$$

where $(r_{out} - r_{in})$ is the radial depth of windings 27.

Equation 23 may be used to obtain a further optimization of the power output. Note that the amount of flux enclosed by an individual winding 27 depends on the area it circumscribes, which is equal to its radial depth, $(r_{out} - r_{in})$, multiplied by its length, h. Increasing the circumscribed area therefore increases the induced voltage. However, as shown by Equations 19 and 23, increasing the area also increases the inductance of the winding, which, as shown by Equation 16, would decrease the power output. There are thus two competing effects, the result of which is to define an optimum value for the area circumscribed by a singular winding 27. To determine the optimum radial depth of windings 27, Equation 23 is substituted into Equation 22:

$$\sum P_{\max} = \left[\frac{\pi B_0^2 \alpha^2 h^2 \omega_0}{2\mu_0}\right]\left(\frac{r_{out}}{\alpha}\right)^{(2N+1)} \left\{\frac{\left[1 - \left(\frac{r_{in}}{r_{out}}\right)^N\right]^2}{1 + \left(\frac{r_{out}}{h}\right)\left(1 - \frac{r_{in}}{r_{out}}\right)}\right\} \text{ watts} \quad (24)$$

Letting $x = r_{in}/r_{out} < 1$, the expression in braces can be written as:

$$F(x) = \frac{[1 - x^N]^2}{\left[1 + \left(\frac{r_{out}}{h}\right)(1 - x)\right]} \quad (25)$$

The function F(x) has a maximum value, $F_{max}$, as a function of x for given values of N and $(r_{out}/h)$. Inserting this value into Equation 24 there results the final maximized expression for the power output:

$$\sum P_{\max} = \pi\left[\frac{B_0^2 \alpha^2 h \omega_0}{2\mu_0}\right]\left(\frac{r_{out}}{\alpha}\right)^{(2N+1)} F_{\max} \text{ watts} \quad (26)$$

Note that the term in square brackets is identical to the expression in Equation 12. This equation was obtained by using Poyntings Theorem to estimate the maximum possible power output from motor/generator 15 and to determine the scaling laws for that output in terms of the magnetic field and dimensional parameters of the generator.

As an example of the use of Equation 26 for the design of a generator, consider the following parameters for a physically small generator, but one with a relatively high power output.

$\alpha = 0.5$ m.
h = 1.5 m.
N = 64
$r_{out}/\alpha = 0.98$
$B_0$ = magnetic field of Halbach array 17 = 1.0 tesla
$\omega_0$ = 2090 radians/sec. (20,000 RPM)

The maximum value for F(x) in Equation 26, $F_{max}$, is the optimal value for the radial depth of windings 27: $F_{max} = 0.981$ at x=0.949. Inserting this value for $F_{max}$ and the respective values for the other parameters into Equation 27 gives a maximized power output of 145 megawatts. This power output is to be compared with the theoretical upper limit to the power transfer, 625 megawatts, obtained from Equation 12. This example demonstrates the assertion made earlier that output powers that are a substantial fraction of the theoretical maximum can be achieved with a generator of the present invention.

The foregoing derivations and discussion provide a basis for describing the present invention. Consider first the means for regulating and controlling the power output of motor/generator 15. The proposed means proposed can be understood by examination of Equation 26 for the power output. This equation contains a term, $(r_{out}/\alpha)^{2N}$, that expresses the variation in output with the outer radius, $r_{out}$, of windings 27 relative to the inner radius, $\alpha$, of Halbach array 17. If N>>1, this term becomes very sensitive to the ratio of the two radii, i.e., to gap 33 between inner surface 21 of Halbach array 17 and outer sections 31 of windings 27. Using the parameters of the previous example, N=64, $\alpha$=0.5 m. and $(r_{out}/\alpha)$=0.98, gap 33 equals 0.02*$\alpha$=0.01 m. From Equation 26, a decrease in gap 33 by 1.0 mm would result in an increase in the power output from 145 megawatts to 188 megawatts. This example shows that the power produced by motor/generator 15 can be regulated by varying gap 33 by means of extensible and retractable supports 35. Hydraulic, mechanical, or electromechanical operation of supports 35 could be employed. The operation of supports 35 could be controlled manually or with a servomechanism.

The forgoing description of the regulation of the voltage output of motor/generator 15 when operated as a generator is applicable to its operation as a motor as well. More particularly, under fixed or variable speed operation controlling the dimension of gap 33 will control the torque produced by the motor and thus its power. In this way the mechanical power output can be adjusted to respond to changes in the load. An example of this use of the control feature is where an electric motor is used to drive the compressor of an air-conditioning system, with the load being dependent on the ambient temperature of the space that is being cooled.

It is to be understood, of course, that the foregoing description relates only to embodiments of the invention, and that modifications to these embodiments may be made without departing from the spirit and scope of the invention as set forth in the following claims.

I claim:

1. A motor/generator for regulating an output voltage or a mechanical power output, comprising:
   a rotor including a Halbach array; and
   a stator including a plurality of electrically conductive windings, wherein at least one winding of said plurality of electrically conductive windings is attached to an extensible and retractable support.

2. The motor/generator of claim 1, wherein:
   said rotor is rotatable about an axis of rotation;
   said stator and said rotor are concentric, with said stator lying closer to said axis than said rotor; and
   said stator is stationary relative to said axis of rotation.

3. The motor/generator of claim 2, wherein said gap varies radially relative to said axis of rotation.

4. The motor/generator of claim 3, wherein:
   said Halbach array is comprised of a plurality of magnets configured in a cylindrical shape, and has an inner surface and an outer surface, with said inner surface being closer to said axis of rotation than said outer surface; and
   said rotor includes a cylinder attached to said outer surface.

5. The motor/generator of claim 4, wherein said cylinder is comprised of a fiber composite.

6. The motor/generator of claim 4, wherein:

said Halbach array generates a magnetic field having a pole order; and said plurality of magnets is a number equal to four times said pole order.

7. The motor/generator of claim 4, wherein:

each of said windings has an approximately rectangular shape including an inner section and an outer section, with said inner section being closer to said axis of rotation than said outer section; and said gap lies in between said inner surface of said Halbach array and said outer section of said windings.

8. The motor/generator of claim 7, further comprising:

a plane intersecting each of said windings, respectively, and said axis of rotation; and said windings being azimuthally spaced apart from each other, whereby said windings are azimuthally disposed around said axis of rotation.

9. The motor/generator of claim 8, wherein:

each of said windings lies in between two other of said windings and is spaced apart from each of said two other windings by a spacing; and said spacing is equal for each of said windings.

10. The motor/generator of claim 9, further comprising:

a centripetal magnetic field emanating from said Halbach array;

said magnetic field having a wavelength; and said spacing being at least one-half of said wavelength.

11. The motor/generator of claim 7, wherein said support is located in between said axis of rotation and said inner section of said windings.

12. The motor/generator of claim 1, wherein:

said rotor is rotatable about an axis of rotation at an angular velocity; and a gap between said at least one winding and said rotor is varied by said support to maintain an output voltage at an approximately constant value independent of angular velocity.

13. The motor/generator of claim 1, wherein:

a variable input voltage applied to said stator is converted into a mechanical power output; and a gap between said at least one winding and said rotor is varied by said support to maintain the mechanical work output at an approximately constant value independent of input voltage.

14. A method for regulating an output voltage of a generator comprising:

generating an output voltage by rotating a rotor including a Halbach array, with respect to a stator, wherein said stator includes a plurality of electrically conductive windings, wherein at least one winding of said plurality of electrically conductive windings is attached to an extensible and retractable support; and regulating said output voltage by varying a radial gap between said Halbach array and said stator by adjusting said extensible and retractable support.

* * * * *